US009313145B2

United States Patent
Gandhi et al.

(10) Patent No.: US 9,313,145 B2
(45) Date of Patent: Apr. 12, 2016

(54) SIGNALING CO-ROUTED AND NON CO-ROUTED LSPS OF A BIDIRECTIONAL PACKET TE TUNNEL

(71) Applicant: Cisco Technology, Inc., San Jose, CA (US)

(72) Inventors: Rakesh Gandhi, Stittsville (CA); Muthurajah Sivabalan, Kanata (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/735,971

(22) Filed: Jun. 10, 2015

(65) Prior Publication Data

US 2015/0281115 A1 Oct. 1, 2015

Related U.S. Application Data

(63) Continuation of application No. 14/299,912, filed on Jun. 9, 2014, now Pat. No. 9,083,553, which is a continuation of application No. 13/541,572, filed on Jul. 3, 2012, now Pat. No. 8,750,310.

(51) Int. Cl.
| | |
|---|---|
| *H04L 12/913* | (2013.01) |
| *H04L 12/46* | (2006.01) |
| *H04L 12/721* | (2013.01) |
| *H04L 12/723* | (2013.01) |
| *H04L 12/911* | (2013.01) |

(52) U.S. Cl.
CPC .......... *H04L 47/724* (2013.01); *H04L 12/4633* (2013.01); *H04L 45/36* (2013.01); *H04L 45/50* (2013.01); *H04L 47/825* (2013.01)

(58) Field of Classification Search
None
See application file for complete search history.

(56) References Cited

U.S. PATENT DOCUMENTS

| | | | |
|---|---|---|---|
| 7,489,695 B1 | 2/2009 | Ayyangar | |
| 7,590,048 B2 | 9/2009 | Doukai | |
| 7,903,553 B2 | 3/2011 | Liu | |
| 2006/0067210 A1* | 3/2006 | Liu | H04L 12/5695 370/217 |
| 2006/0159009 A1 | 7/2006 | Kim et al. | |
| 2008/0144641 A1 | 6/2008 | Le Roux et al. | |
| 2008/0186951 A1* | 8/2008 | Hirota | H04L 45/00 370/351 |

OTHER PUBLICATIONS

Braden, et al., Request for Comments (RFC) 2205, Resource ReSerVation Protocol (RSVP), Sep. 1997.
Awduche, et al., Request for Comments (RFC) 3209, RSVP-TE: Extensions to RSVP for LSP Tunnels, Dec. 2001.
Berger, Request for Comments (RFC) 3471, Generalized Multi-Protocol Label Switching (GMPLS) Signaling Functional Description, Jan. 2003.
Berger, Request for Comments (RFC) 3473, Generalized Multi-Protocol Label Switching (GMPLS) Signaling Resource ReSerVation Protocol—Traffic Engineering (RSVP-TE) Extensions, Jan. 2003.
Zhang, et al.—RSVP-TE Extensions for Associated Bidirectional LSPs <draft-ietf-ccamp-mpls-tp-rsvpte-ext-associated-lsp-03> Internet Draft, Mar. 2012.
Berger—RSVP Association Object Extensions <draft-ietf-ccamp-assoc-ext-03.txt> Internet Draft, Mar. 2012.

* cited by examiner

*Primary Examiner* — Hong Cho
(74) *Attorney, Agent, or Firm* — Polsinelli PC (57) ABSTRACT

Particular embodiments may enable setup and signaling of co-routed and non co-routed label switched paths (LSPs) of a bidirectional packet traffic engineering (TE) tunnel in an unambiguous manner with respect to provisioning of the LSPs/tunnel. A head-end node may set up the bidirectional packet TE tunnel by computing a forward (and possibly a reverse) direction LSP, and then signal the bidirectional TE tunnel utilizing, e.g., extensions to an associated Resource Reservation Protocol (RSVP) signaling method. The extensions to the associated RSVP signaling method include a plurality of additional Association Types of an Extended Association object carried in a RSVP Path message transmitted by the head-end node to the tail-end node over the forward direction LSP, wherein the additional Association Types explicitly identify the provisioning of the forward and reverse direction LSPs as co-routed or non co-routed.

20 Claims, 5 Drawing Sheets

SIGNALING CO-ROUTED AND NON CO-ROUTED LSPS OF A BIDIRECTIONAL PACKET TE TUNNEL

RELATED CASES

This application is a continuation of U.S. patent application Ser. No. 14/299,912, filed Jun. 9, 2014, now U.S. Pat. No. 9,083,553, which is a continuation of U.S. patent application Ser. No. 13/541,572, filed on Jul. 3, 2012, now U.S. Pat. No. 8,750,310, the contents of each of the above patent applications are hereby expressly incorporated by reference in their entirey for all purposes.

TECHNICAL FIELD

The present disclosure relates generally to computer networks, and, more particularly, to provisioning of bidirectional packet Traffic Engineering (TE) tunnels in a computer network.

BACKGROUND

Generalized Multi-Protocol Label Switching (GMPLS) signaling extensions, described in Request for Comments (RFC) 3473, entitled *Generalized Multi-Protocol Label Switching (GMPLS) Signaling Resource ReserVation Protocol-Traffic Engineering (RSVP-TE) Extensions* published January 2003, may be used to set up and signal co-routed bidirectional packet traffic engineering (TE) tunnels. An example of a bidirectional packet TE tunnel is two Multi-Protocol Label Switching (MPLS) TE label switched paths (LSPs), where one of the MPLS TE LSPs is a forward direction LSP (e.g., extending from a head-end node of the TE tunnel to a tail-end node of the tunnel) and the other of the MPLS TE LSPs is a reverse direction LSP (e.g., extending from the tail-end node to the head-end node). Alternatively, an associated Resource Reservation Protocol (RSVP) signaling method, described in Zhang et al., *RSVP-TE Extensions for Associated Bidirectional LSPs <draft-ietf-ccamp-mpls-tp-rsvpte-ext-associated-lsp-03>* Internet Draft, March 2012, can be used to set up and signal co-routed or non co-routed bidirectional packet TE tunnels. As used herein, a co-routed bidirectional packet TE tunnel denotes a bidirectional tunnel where the forward direction LSP and reverse direction LSP utilize the same path, e.g., the same node(s) and link(s). In contrast, a non co-routed bidirectional packet TE tunnel denotes a bidirectional tunnel that utilizes two different paths, i.e., the forward direction LSP path is different than the reverse direction LSP path.

It may be beneficial for the head-end node to indicate, e.g., to one or more nodes of the bidirectional packet TE tunnel, the provisioning of the LSPs to ensure appropriate signaling, handling and control of, e.g., the reverse direction LSP. As used herein, provisioning denotes, e.g., the configuration of the LSPs as co-routed or non co-routed; that is, whether the LSPs of the bidirectional TE tunnel are co-routed or non co-routed. Although a system administrator may construct a set of rules for the node(s) to determine whether the LSPs are co-routed (or not) using RSVP signaling messages and objects, such construction may lead to ambiguity and interoperability issues as different administrators may construct different rules to infer whether the LSPs are co-routed (or not).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Particular embodiments may enable setup and signaling of co-routed and non co-routed label switched paths (LSPs) of a bidirectional packet traffic engineering (TE) tunnel in an unambiguous manner with respect to provisioning of the LSPs/tunnel. A head-end node may set up the bidirectional TE tunnel by computing path(s) for a forward (and possibly a reverse) direction LSP, and then signal the bidirectional TE tunnel utilizing, e.g., extensions to an associated Resource Reservation Protocol (RSVP) signaling method. In an embodiment, the extensions to the associated RSVP signaling method include a plurality of additional Association Types of an Extended Association object carried in a RSVP Path message transmitted by the head-end node to the tail-end node over the forward direction LSP, where the additional Association Types explicitly identify the provisioning of the forward and reverse direction LSPs of the bidirectional TE tunnel as co-routed or non co-routed.

Upon receiving the RSVP Path message, the tail-end node may examine objects of the message, including the Extended Association object, and may use the additional Association Type of co-routed or non co-routed LSP to set up and signal an appropriate reverse direction LSP to bring up the bidirectional TE tunnel. For example, if an explicit route object (ERO), i.e., a reverse direction ERO, is present in the RSVP Path message, the tail-end node may signal the reverse direction LSP using the ERO irrespective of the Association Type. However, if the ERO is not present in the RSVP Path message and the Association Type is non co-routed, the tail-end node may compute and signal the reverse direction LSP. In addition, if the ERO is not present in the RSVP Path message and the Association Type is co-routed, the tail-end node may examine the Path message to determine whether a record route object (RRO), i.e., a path RRO, is present in the message. If the RRO is present, the tail-end node may use the RRO to signal the co-routed reverse direction LSP. On the other hand, if the RRO is not present in the RSVP path message, the tail-end node may attempt to compute (and thereafter signal) the reverse direction LSP. If it is unable to compute the path for (or thereafter signal) the reverse direction LSP, then the tail-end node may send a RSVP signaling error to the head-end node.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, wireless links, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by intradomain routers configured to execute intradomain routing protocols, and are generally subject to a common authority. It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain," and a router that interconnects different domains is generally referred to as a "border router."

Figure 1:
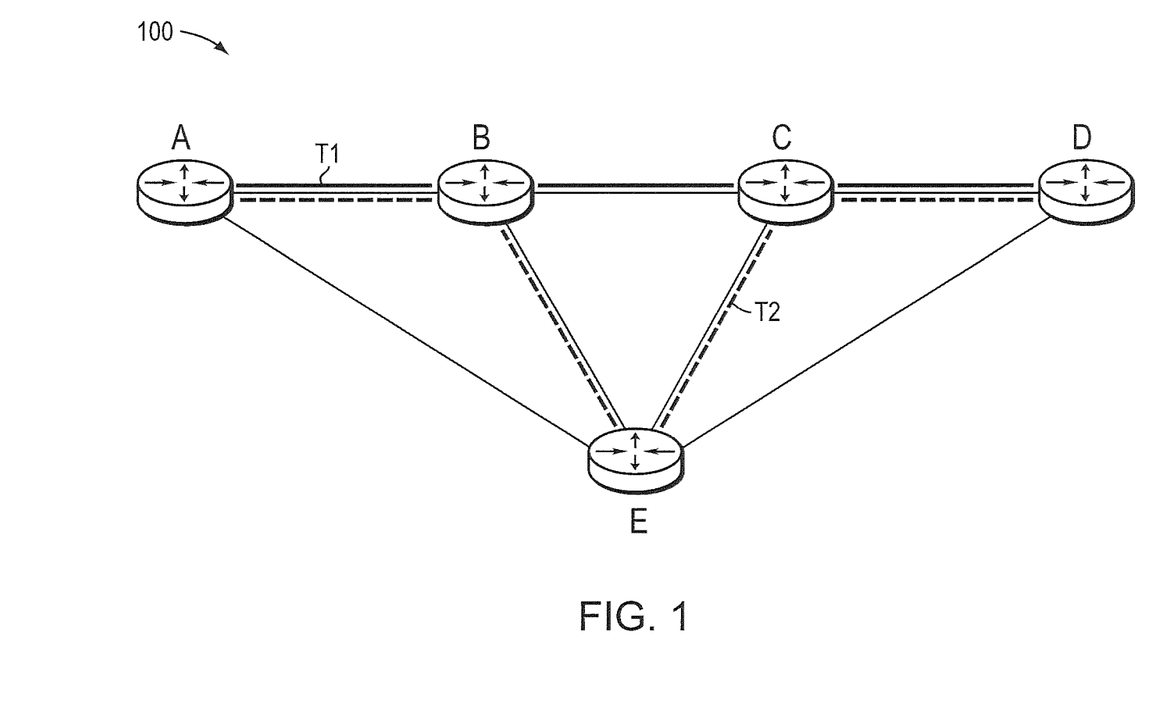
FIG. 1 illustrates an example computer network.

FIG. 1 illustrates an example computer network 100 illustratively comprising nodes (e.g., routers) A-E interconnected by links as shown. As described herein, one or more tunnels may traverse the links between head-end node (e.g., node A) and tail-end node (e.g., node D), such as through one or more intermediate nodes (e.g., nodes B, C and E), as will be understood by those skilled in the art. Those skilled in the art will also understand that any number of nodes, routers, links (e.g., with any bandwidth values) may be used in the computer network, and that the view shown herein is for simplicity. Further, those skilled in the art will also understand that while the disclosure herein is described generally, it may apply to, e.g., customer networks and provider core networks with provider and provider edge routers, any network configuration within a single AS or domain, or throughout multiple ASes or domains.

Data packets may be exchanged among the nodes of the computer network 100 using predefined network communication protocols such as, e.g., the Transmission Control Protocol/Internet Protocol (TCP/IP), User Datagram Protocol (UDP), Asynchronous Transfer Mode (ATM) protocol, Frame Relay protocol, and/or Internet Packet Exchange (IPX) protocol.

Figure 2:
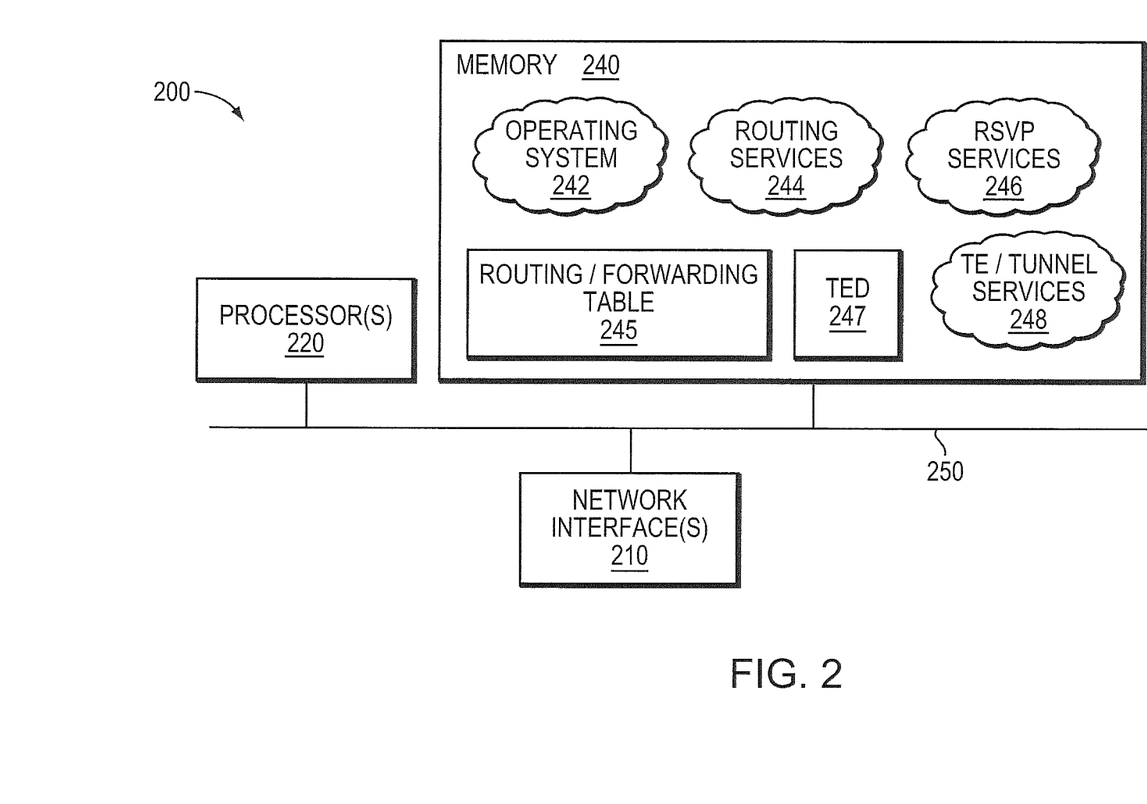
FIG. 2 illustrates an example node/router.

FIG. 2 illustrates an example node/router 200 that may be used with one or more embodiments described herein, e.g., as a head-end node, tail-end node or intermediate node (label switched routers, "LSRs"). The node may comprise one or more network interfaces 210, one or more processors 220, and a memory 240 interconnected by a system bus 250. The network interface(s) 210 contains the mechanical, electrical and signaling circuitry for communicating data over physical and/or wireless links coupled to the network 100. The network interface(s) may be configured to transmit and/or receive data using a variety of different communication protocols, including, inter alia, TCP/IP, UDP, ATM, synchronous optical networks (SONET), wireless protocols, Frame Relay, Ethernet, and/or Fiber Distributed Data Interface (FDDI). Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interface(s) 210 for storing software programs and data structures associated with the embodiments described herein. The processor(s) 220 may comprise necessary elements or logic adapted to execute the software programs and manipulate the data structures, such as routes or labels of a routing/forwarding table 245 and Traffic Engineering Database (TED) 247. An operating system 242, portions of which are typically resident in memory 240 and executed by the processor(s), functionally organizes the node by, inter alia, invoking operations in support of software processes and/or services executing on the node. These software processes and/or services may comprise routing services 244, Resource ReSerVation Protocol (RSVP) services 246, and Traffic Engineering (TE)/Tunnel services 248. It will be apparent to those skilled in the art that other processor and memory types, including various computer-readable media, may be used to store and execute program instructions pertaining to the embodiments described herein. Also, while the description herein illustrates various processes/services, it is expressly contemplated that the various processes/services may be embodied as modules configured to operate in accordance with the various embodiments described herein (e.g., according to the functionality of a similar process/service).

Routing services 244 contain computer executable instructions executed by processor(s) 220 to perform functions provided by one or more routing protocols, such as the Interior Gateway Protocol (IGP), e.g., Open Shortest Path First (OSPF) and Intermediate-System-to-Intermediate-System (IS-IS), and/or the Border Gateway Protocol (BGP), as will be understood by those skilled in the art. These functions may be configured to manage routing and forwarding table 245 containing, e.g., data used to make routing and forwarding decisions. Notably, routing services 244 may also perform functions related to virtual routing protocols, such as maintaining VRF instances (not shown) as will be understood by those skilled in the art.

Multi-Protocol Label Switching (MPLS) Traffic Engineering (TE) has been developed to meet data networking requirements such as guaranteed available bandwidth or fast restoration. MPLS TE exploits modern label switching techniques to build end-to-end tunnels based on a series of constraints through an IP/MPLS network of label switched routers (LSRs). These tunnels are a type of label switched path (LSP) and thus are generally referred to as MPLS TE-LSPs. An example of MPLS-TE can be found in RFC 3209, entitled *RSVP-TE: Extensions to RSVP for LSP Tunnels* dated December 2001.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, inter alia, the Layer Two Tunnel Protocol (L2TP), the Point-to-Point Tunneling Protocol (PPTP), and IP tunnels.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205, dated September 1997. In the case of traffic engineering applications, RSVP signaling is used to establish a TE-LSP (tunnel) and to convey various TE-LSP attributes to routers, such as border routers, along the TE-LSP obeying the set of required constraints whose path may have been computed by various means.

In particular, RSVP services 246 contain computer executable instructions for implementing RSVP and processing RSVP messages in accordance with the embodiments described herein. Further, TE/Tunnel services 248 contain computer executable instructions for implementing TE functions in accordance with the embodiments described herein. Examples of Traffic Engineering are described in RFC 3209, as noted above, as well as in RFC 3473, entitled *Generalized Multi-Protocol Label Switching (GMPLS) Signaling Resource ReSerVation Protocol-Traffic Engineering (RSVP-TE) Extensions* dated January 2003 and RFC 3471, entitled *Generalized Multi-Protocol Label Switching (GMPLS) Signaling Functional Description.* TED 247 may be used to store TE information provided by the routing protocols, such as IGP, BGP, and/or RSVP (e.g., with TE extensions as described herein). The TED may be illustratively maintained and managed by TE/Tunnel services 248.

Establishment of a tunnel (e.g., a MPLS TE-LSP) illustratively involves computation of a path between a head-end node (LSR) to a tail-end node, signaling along the path, and modification of forwarding tables and/or databases at the nodes, including intermediate nodes (LSRs), along the path. Optimally, the computed path is the "shortest" path, as measured in some metric (cost, length, etc.), that satisfies all relevant LSP TE constraints or attributes, such as e.g., required bandwidth, affinities (administrative constraints to avoid or include certain links), priority, and/or class type. Path computation can either be performed by the head-end node or by the tail-end node, as described further herein. Various path computation methodologies are available including Constrained Shortest Path First (CSPF), as will be understood by those skilled in the art.

Tunnels may be configured within a single domain (e.g., area, level, or AS) or may also span multiple domains (e.g., areas, levels, or ASes) and may have guaranteed bandwidth under certain conditions. Illustratively, the tunnels may be signaled through the use of the RSVP protocol (with Traffic Engineering extensions), and in particular, RSVP TE signaling messages. It should be understood that the use of RSVP serves only as an example, and that other communication protocols may be used in accordance with the embodiments described herein.

In accordance with RSVP, to request a data flow (tunnel) between a sender (head-end node) and a receiver (tail-end node), the sender may send an RSVP path request (Path) message downstream to the receiver along a path (e.g., a unicast route) to identify the sender and indicate e.g., bandwidth needed to accommodate the data flow, along with other attributes of the tunnel. The Path message may contain various information about the data flow including, e.g., traffic characteristics of the data flow. Also in accordance with the RSVP, a receiver may establish the tunnel between the sender and receiver by responding to the sender's Path message with a reservation request (Resv) message. The Resv message travels upstream hop-by-hop (i.e., along intermediate nodes) along the flow from the receiver to the sender. The Resv message may contain information that is used by intermediate nodes along the flow to reserve resources for the data flow between the sender and the receiver, confirm the attributes of the tunnel, and provide a tunnel label. If an intermediate node in the path between the sender and receiver acquires a Path message or Resv message for a new or established reservation (tunnel) and encounters an error (e.g., insufficient resources, failed network element, etc.), the intermediate node generates and forwards a path or reservation error (PathErr or ResvErr, hereinafter Error) message to the sender or receiver, respectively.

Figure 3:
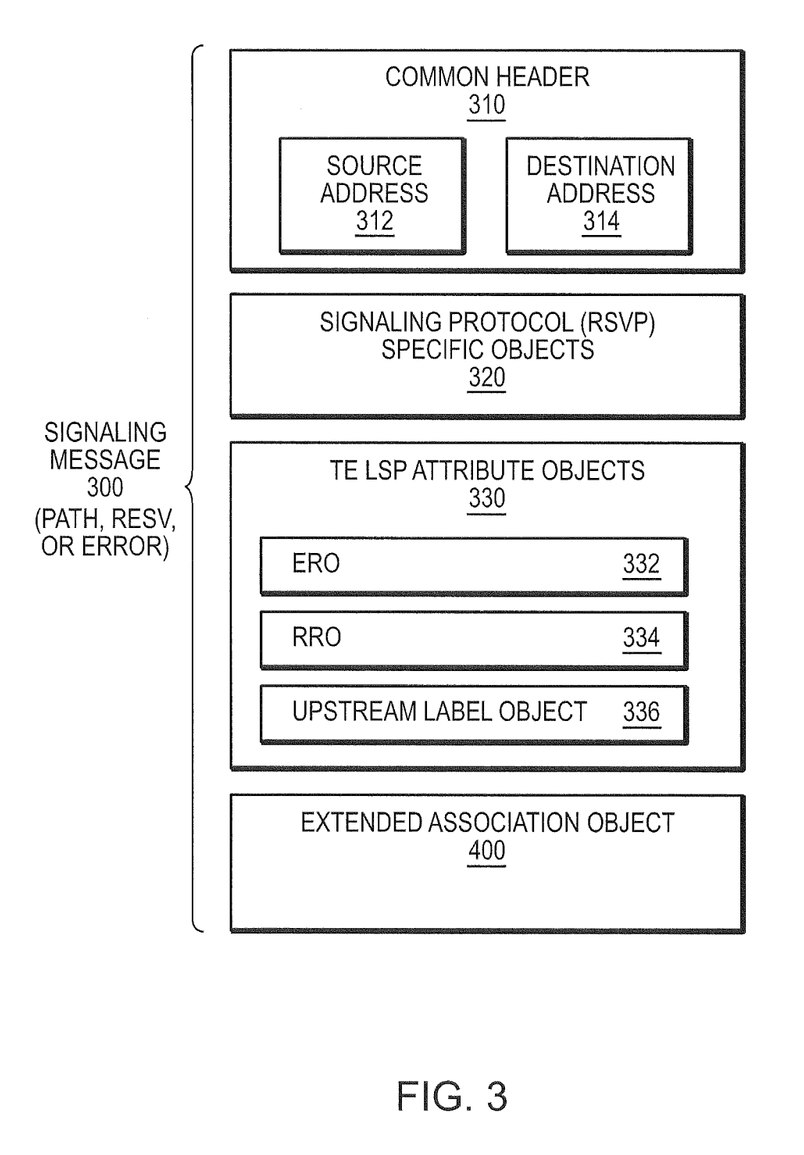
FIG. 3 illustrates portions of an example signaling message.

FIG. 3 illustrates portions of an example signaling message 300 (e.g., RSVP message, such as Path, Resv or Error) that may be used with one or more embodiments described herein. Message 300 contains, inter alia, a common header 310 with one or more signaling protocol (RSVP) specific objects 320, including one or more TE LSP Attribute objects 330, as well as an Extended Association object 400, as described herein. The common header 310 may comprise a source address 312 and destination address 314, denoting the origination and requested termination of the message 300. Protocol specific objects 320 contain objects necessary for each type of message 300 (e.g., Path, Resv, Error, etc.). For instance, a Path message may have a sender template object, Tspec object, Previous-hop object, etc. A Resv message, on the other hand, may have specific objects 320 for a label object, session object, filter spec object, etc. Also, Error messages 300 (e.g., PathErr or ResvErr), may also have specific objects 320 such as, e.g., for defining the type of error.

The TE LSP Attribute objects 330 may include an explict route object (ERO) 332, a record route object (RRO) 334 and an Upstream Label object 336. When incorporated into a RSVP Path message, the ERO 332 encapsulates a concatenation of nodes, i.e., "hops", which constitutes an explicitly routed path. Using the ERO, the paths taken by label-switched RSVP-MPLS packet traffic can be predetermined, independent of conventional IP routing. By adding the RRO 334 to the Path message, a sender node can receive information about an actual route that the LSP tunnel traverses. That is, each of the nodes along the route/path may record route information, e.g., an IP address of the next hop, in the RRO object. The route information may be collected in RRO sub-objects for both directions (e.g., a path RRO for the Path message and a reserve RRO for the Resv message) and collectively those sub-objects constitute the path RRO and the reserve RRO. The sender node can also use the RRO 334 to request notification from the network concerning changes to the routing path. The Upstream Label object 336 may be added to the Path message to support bidirectional LSPs, as described herein. Various methods understood by those skilled in the art may be utilized to produce EROs 332, RROs 334 and Upstream Label objects 336 contained in signaling messages for a tunnel.

While unidirectional tunnels may be sufficient for some applications, other applications may utilize bidirectional tunnels configured to transfer certain QoS traffic from a sender to a receiver over the computer network. An example of a bidirectional packet TE tunnel is two MPLS TE LSPs, wherein one of the MPLS TE LSPs is a forward direction LSP (e.g., extending from a head-end node of the TE tunnel to a tail-end node of the tunnel) and the other of the MPLS TE LSPs is a reverse direction LSP (e.g., extending from the tail-end node to the head-end node). In an embodiment, the TE head-end node may signal and control the bidirectional tunnel (both LSPs) typically by first performing a CSPF calculation for both forward and reverse direction LSPs. Illustratively, the constraint of the CSPF calculation may be directed to bandwidth, i.e., ensuring that, for example, a minimum bandwidth requirement of one or more links is met. During an admission process, e.g, a Call Admission Control (CAC) process, a check may be performed on the bandwidth constraint to ensure that once the path is signaled, the required bandwidth is available. Once the CSPF calculation has determined the availability of one or more paths having the potential to satisfy the bidirectional bandwidth requirement, the head-end node may then signal the bidirectional tunnel utilizing, for example, the RSVP protocol with the Path (and Resv) messages.

As used herein, RSVP signaling for the forward direction LSP typically involves sending a RSVP Path message from the head-end node to the tail-end node over the calculated forward LSP path, and then the tail-end node returning a RSVP Resv message over the path to the head-end node. Similarly, signaling for the reverse direction LSP typically involves sending a Path message from the tail-end node to the head-end node over the calculated reverse LSP path and then the head-end node returning the Resv message over the path, where it is eventually received at the tail-end node. Note that if the TE head-end node does not provide an ERO with respect to the reverse direction LSP, the tail-end node may perform the CSPF calculation for the reverse direction LSP.

In an embodiment, the head-end node may include an ERO 332 within the Path message 300, wherein the ERO 332 specifies the path, i.e, an explicit (preferred) route, for packets to traverse over the reverse direction LSP. Typically, the way that the TE head-end node conveys the calculated reverse direction LSP to, e.g., the tail-end node is via the ERO 332. Once the TE tunnel is set up, the head-end node may program its local forwarding, e.g., update its routing/forwarding table 245 and/or TED 247, to carry packet traffic in the forward direction. That is, once the TE tunnel has been calculated (via, e.g., CSPF) and signaled (via, e.g., the RSVP Path and Resv message exchange), then programming of the local forwarding is performed to carry traffic over the forward direction LSP.

Upon receiving the Path message, the TE tail-end node may create a tunnel in the reverse direction (i.e., a reverse direction LSP) and signal the reverse direction LSP. If an ERO 332 is provided in the Path message 300, the TE tail-end node creates the reverse direction LSP using the contents of the ERO 332; otherwise the TE tail-end node may create the LSP by performing a CSPF calculation to determine the reverse direction LSP. Thereafter, the tail-end node signals the calculated reverse direction LSP using, e.g., RSVP protocol messaging. In an embodiment, the tail-end node signals the reverse direction LSP by sending a RSVP Path message 300 over the calculated path to the head-end node in accordance with the Path/Resv message exchange. The TE tail-end node may then program/update its local routing/forwarding table 245 and/or TED 247 to carry packet traffic in the reverse direction. As a result, the LSPs (a forward direction LSP and a reverse direction LSP) of the bidirectional tunnel are created, signaled and programmed.

Illustratively, with reference again to FIG. 1, head-end node A may establish a LSP (tunnel) T1 (denoted by a solid line) along a path as shown to tail-end node D, and tail-end node D may establish a LSP (tunnel) T2 (denoted by a dotted line) along a path as shown to head-end node A, wherein T1 and T2 collectively form a bidirectional TE tunnel. In particular, LSP/tunnel T1 may traverse a path of links in network 100 between nodes A, B C, and D, whereas LSP/tunnel T2 may traverse a path of links in network 100 between nodes D, C, E, B, and A.

Generalized Multi-Protocol Label Switching (GMPLS) signaling extensions, described in RFC 3473, entitled *Generalized Multi-Protocol Label Switching (GMPLS) Signaling Resourse ReserVation Protocol-Traffic Engineering (RSVP-TE) Extensions* published January 2003, may be used to set up co-routed bidirectional packet TE tunnels. As used herein, a co-routed bidirectional packet TE tunnel denotes a bidirectional tunnel wherein the forward direction LSP and reverse direction LSP share the same path, e.g., the same node(s) and link(s). RFC 3473 (and RFC 3471) enables establishment of both the downstream (forward direction) and upstream (reverse direction) data paths (LSPs) of a bidirectional tunnel using a single set of signaling messages, e.g., one RSVP Path message is sent for both forward and reverse direction LSPs and one RSVP Resv message is sent for both forward and reverse direction LSPs. In one or more embodiments, setup of the bidirectional tunnel may be indicated by the presence of an Upstream Label object 336 in the appropriate signaling message, e.g., the RSVP Path message, as will be understood by those skilled in the art.

Figure 4:
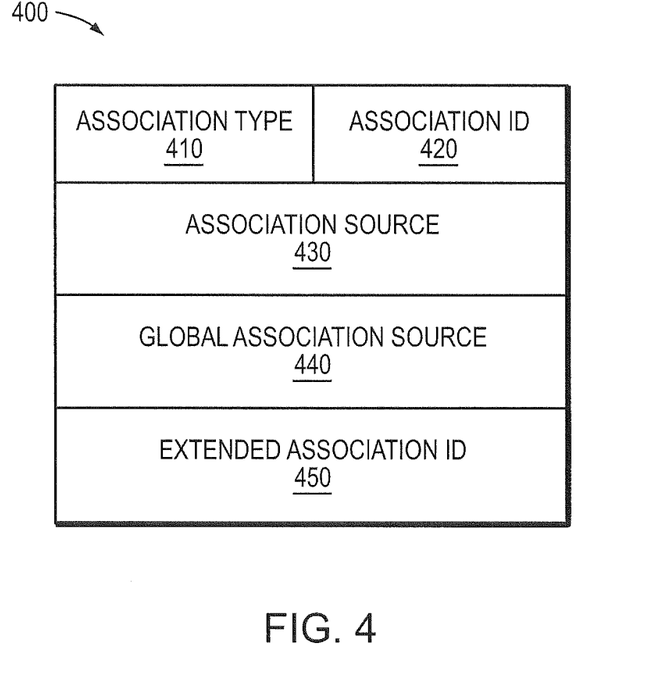
FIG. 4 illustrates portions of an example Extended Association object.

Alternatively, an associated Resource Reservation Protocol (RSVP) signaling method, described in Zhang et al., *RSVP-TE Extensions for Associated Bidirectional LSPs* <draft-ietf-ccamp-mpls-tp-rsvpte-ext-associated-lsp-03> Internet Draft, March 2012, can be used to set up co-routed or non co-routed bidirectional packet TE tunnels. As noted, a co-routed bidirectional TE tunnel utilizes the same path for both its forward direction LSP and reverse direction LSP. In contrast, a non co-routed bidirectional packet TE tunnel denotes a bidirectional tunnel that utilizes two different paths, i.e., the forward direction LSP path is different than the reverse direction LSP path. Illustratively, the associated RSVP signaling method enables establishment of a bidirectional tunnel using the RSVP signaling (i.e., the Path/Resv message exchange) for each of the forward direction LSP and reverse direction LSP, as described previously herein. In particular, the associated RSVP signaling method may be used to set up co-routed (or non co-routed) bidirectional packet TE tunnels by, e.g., binding or associating two independent unidirectional LSPs using Association Types of the Extended Association object 400.

FIG. 4 illustrates portions of an example Extended Association object 400 that may be used with one or more embodiments described herein. Object 400 includes, inter alia, an Association Type field 410, an Association Identifer (ID) field 420, an Association Source field 430, a Global Association Source field 440 and, optionally, an Extended Association ID field 450. The Association Type field 410 contains a value indicating the type of association being identified, as described further herein. The Association ID field 420 contains a value assigned by a node that originated the association that, when combined with the other fields carried in object 400, uniquely identifies an association. The Association Source field 430 contains an IPv4 or IPv6 address, respectively, that is associated to the node that originated the association. The Global Association Source field 440 contains a value that is a unique global identifier and the Extended Association ID field 450 contains data that is additional information to support unique identification.

In order to bind two reverse unidirectional LSPs to be an associated bidirectional LSP/tunnel, <draft-ietf-ccamp-mpls-tp-rsvpte-ext-associated-lsp-03> sets forth the following Association Types for the field 410 of the Extended Association object 400:

(1) Double Sided Associated Bidirectional LSPs (D); and
(2) Single Sided Associated Bidirectional LSPs (A).

Broadly stated, single-sided provisioning denotes configuration of the bidirectional tunnel, including properties and path options specifying the type of computed path, at one end of the tunnel, e.g., the head-end node. That is, the head-end node may provision the tunnel prior to computing both the forward and the reverse direction LSPs, and illustratively may convey the reverse direction LSP by, e.g., use of an ERO 332 in a Path message 300. The other end of the tunnel, e.g., the tail-end node, may receive the Path message and, in response, may dynamically create and signal the tunnel.

Double-sided provisioning denotes the existence of configuration at both ends of the tunnel; however the amount of configuration may vary. Here, the head-end node may utilize its configuration to provision the tunnel and perform path calculations for both forward and reverse direction LSPs, and provide the ERO for the reverse direction LSP. If the head-end node indicates the path for the reverse direction LSP via the ERO, the tail-end node may use that calculated path. Yet, if the head-end node does not indicate the path for the reverse LSP via an ERO, the tail-end node may utilize the calculated path using, e.g, one or more other objects of the message or may utilize its configuration to provision the tunnel and perform a CSPF computation to create a path for the reverse direction LSP.

Illustratively, with reference once again to FIG. 1, head-end node A may provision, compute and signal both LSP/tunnel T1 (denoted by a solid line) and LSP/tunnel T2 (denoted by a dotted line) as a forward direction LSP and a reverse direction LSP, respectively, of a bidirectional tunnel in accordance with, e.g., single-sided associated bidirectional provisioning as provided by <draft-ietf-ccamp-mpls-tp-rsvpte-ext-associated-lsp-03>. Alternatively, head-end node A may provision, compute and signal LSP/tunnel T1 as a forward direction LSP and tail-end node D may provision, compute and signal LSP/tunnel T2 as a reverse direction LSP of the bidirectional tunnel in accordance with, e.g., double-sided associated bidirectional provisioning as provided by the associated RSVP signaling method.

However, <draft-ietf-ccamp-mpls-tp-rsvpte-ext-associated-lsp-03> does not provide explicit indication of co-routed or non co-routed provisioning of the LSPs (e.g., via its provided Association Types), which may lead to interoperability issues among different administrators and their intentions with respect to setting up co-routed or non co-routed LSPs. For example, assume the RSVP Path message 300 transmitted by the head-end node to the tail-end node includes an Extended Association object 400 and a RRO 334, but does not include an ERO 332. The absence of the ERO 332 from the Path message 300 may indicate to the tail-end node that it should simply compute the reverse direction LSP as a non co-routed LSP. Yet it may have been an administrator's intention to set up co-routed LSPs using the RRO information in the Path message 300. Alternatively, the intention of the RRO 334 may have been for an administrative purpose to simply record the path and not to provision co-routed LSPs. Such a situation may lead to ambiguity and an inability to definitively determine whether the LSPs should be co-routed or non co-routed.

As a result, it may be beneficial to indicate to one or more nodes of a bidirectional TE tunnel whether the LSPs are provisioned as co-routed or non co-routed to ensure appropriate signaling, handling and control of, e.g., the reverse direction LSP. Although a system administrator may construct a set of rules for the node(s) to determine whether the LSPs are co-routed using RSVP signaling messages and objects, such construction may also lead to interoperability issues as different administrators may construct different rules to infer whether the LSPs are co-routed. As another example, assume that the RSVP signaling messages and objects include a RSVP Path message 300 having an Extended Association object 400, an ERO 332 and a RRO 334, wherein the ERO 332 specifies a path (calculated by the head-end node) for the tail-end node to use for the reverse direction LSP (i.e., the reverse LSP ERO) and the RRO 334 records the path of the forward direction LSP (i.e., the forward LSP path RRO). Note that the path specified in the ERO may be determined by the head-end node using, e.g., the CSPF calculation. The set of rules may specify that the tail-end node compare the contents of the forward LSP path RRO and the reverse LSP ERO contained in the forward direction RSVP Path message. However, this approach may be ambiguous because, although the comparison may reveal that the routes (as, e.g., calculated by CSPF) are the same, the administrator may not have intended the paths to be co-routed.

In addition, the set of rules may specify that Association IDs 420 (e.g., tunnel numbers) carried in Extended Association objects 400 of Path messages 300 traversing the forward and reverse direction LSPs be checked at a midpoint node of the bidirectional tunnel to infer whether the LSPs are co-routed or non co-routed. However, this approach may also be ambiguous because, even if the checking reveals a match of IDs and, thus, an inference of co-routing, the LSPs could be non co-routed LSPs that happen to traverse the same path in the forward and reverse directions.

Extensions to Associated RSVP Signaling Method

Particular embodiments may enable setup and signaling of co-routed and non co-routed LSPs of a bidirectional packet TE tunnel in an unambiguous manner with respect to provisioning of the LSPs/tunnel. The bidirectional TE tunnel illustratively includes a forward direction LSP and a reverse direction LSP. A head-end node may set up the bidirectional TE tunnel by computing the path for forward (and possibly the reverse) direction LSP, and then signal the bidirectional TE tunnel utilizing, e.g., extensions to the associated RSVP signaling method described herein. In an embodiment, the extensions to the associated RSVP signaling method include a plurality of additional Association Types 410 of the Extended Association object 400 carried in the RSVP Path message 300 transmitted by the head-end node to the tail-end node over the forward direction LSP, wherein the additional Association Types 410 explicitly identify the provisioning of the forward and reverse direction LSPs as co-routed or non co-routed. These additional Association Types 410 include:

Co-routed Double Sided Associated Bidirectional LSPs (D)

Co-routed Single Sided Associated Bidirectional LSPs (A)

Non Co-routed Double Sided Associated Bidirectional LSPs (D)

Non Co-routed Single Sided Associated Bidirectional LSPs (A)

Upon receiving the RSVP Path message 300, the tail-end node may examine objects of the message, including the Extended Association object 400, and may use the additional Association Type 410 of co-routed or non co-routed LSP to set up and signal an appropriate reverse direction LSP in order to bring up the bidirectional TE tunnel. For example, if an ERO 332, e.g., a reverse direction ERO, is present in the RSVP Path message 300, the tail-end node may signal the reverse direction LSP using the ERO irrespective of the Association Type 410. However, if the reverse direction ERO is not present in the RSVP Path message 300 and the Association Type 410 is non co-routed (e.g., Non Co-routed Double Sided Associated Bidirectional LSPs), the tail-end node may compute a path for the reverse direction LSP (e.g., compute an ERO for the reverse direction LSP) and signal the reverse direction LSP. In addition, if the reverse direction ERO is not present in the RSVP Path message 300 and the Association Type 410 is co-routed (e.g., Co-routed Double Sided Associated Bidirectional LSPs), the tail-end node may examine the Path message to determine whether a RRO 334, e.g., a path RRO, is present in the message. If the path RRO is present, the tail-end node may use the path RRO to signal the co-routed reverse direction LSP (e.g., as recorded in the RRO). On the other hand, if the path RRO is not present in the RSVP Path message, the tail-end node may attempt to compute (and thereafter signal) the reverse direction LSP. If it is unable to compute (or thereafter signal) the reverse direction LSP, then the tail-end node may send a RSVP signaling error to the head-end node.

According to one or more embodiments described herein, the tail-end node may further examine the objects of the received RSVP Path message 300, including the Extended Association object 400, and may use the additional Association Types 410 of co-routed or non co-routed LSP to provision, re-set up, signal and/or control the reverse direction LSP in response to an occurrence of an interruption/failure due to, e.g., signaling error, re-optimization (i.e., a need to find a better path) and/or path verification (i.e., verifying the path). For example, if the reverse direction ERO is present in the RSVP Path message 300 originated by the head-end node, the tail-end node may use the reverse direction ERO to relay the error information to the originating head-end node, instructing the head-end node to handle the error. As used herein, the originating head-end node is the node that is configured to perform the path computation for both directions, whereas a real head-end node is the originating head-end node for the forward direction LSP or the tail-end node for the reverse direction LSP.

Alternatively, if the path RRO is present in the Path message 300 and the Association Type 410 is co-routed (e.g., Co-routed Single Sided Associated Bidirectional LSPs), the tail-end node may initially attempt to re-set up the reverse direction LSP using, e.g., the path RRO. However, if it cannot re-set up the reverse direction LSP, the tail-end node may notify the originating head-end node of the failure, e.g., a signaling error or path verification error. Illustratively, the tail-end node notifies the originating head-end node of the failure by, e.g., transmitting an Error message (e.g., a Path Error message) that instructs the head-end node to handle the error. Moreover, if the Association Type is non co-routed (e.g., Non Co-routed Double Sided Associated Bidirectional LSPs), the tail-end node may compute an alternate path for the reverse direction LSP and re-signal the path. If it is unable to compute the reverse direction LSP, the tail-end node may notify the originating head-end node of the failure using, e.g., an Error message.

According to one or more embodiments described herein, a midpoint node (i.e., a node at a midpoint of the bidirectional tunnel) may examine the objects of the RSVP signaling messages, including the Extended Association object 400, and may use the additional Association Types 410 of co-routed or non co-routed LSP in order to determine whether an RSVP signaling error message should be sent in one direction (towards the real head-end node) or both directions (towards the originating head-end node and the real head-end node). As noted above, the head-end node may signal the forward direction LSP in response to the bandwidth requirement being satisfied at a midpoint node of the LSP. The bandwidth requirement is subsequently checked by the midpoint node, e.g., in accordance with the CAC process, to ensure that the forward direction LSP can still carry the amount of requested traffic. When signaling the forward direction LSP, the midpoint node may examine the Association Type field 410 of the Extended Association object 400 to determine whether the LSP association is co-routed or non co-routed. If the association is co-routed (e.g., Co-routed Single Sided Associated Bidirectional LSPs), the midpoint node may also perform the CAC process to check the bandwidth of the reverse direction LSP. This way, the midpoint node can detect a potential failure during, e.g., setup of the reverse direction LSP and notify the originating head-end node so that it may promptly attempt to compute an alternate path.

Illustratively, the signaling error message may be sent by the midpoint node to the originating head-end and tail-end nodes for the co-routed LSPs via, e.g., a RSVP Error message to the real head-end node and a RSVP Notify message to the originating head-end node, wherein the signaling error message may be sent to the real head-end node only in case of non co-routed LSPs. Notably, the midpoint node uses the Association Type 410 (rather than, e.g., the Association ID 420) of the Extended Association object 400 to determine whether the LSPs are co-routed or non co-routed. This is because checking of the Association ID 420 in signaling messages traversing the forward and reverse direction LSPs is not sufficient to infer at the midpoint node whether the LSPs are co-routed or non co-routed, as the non co-routed LSPs may traverse the same path in the forward and reverse directions.

Figure 5:
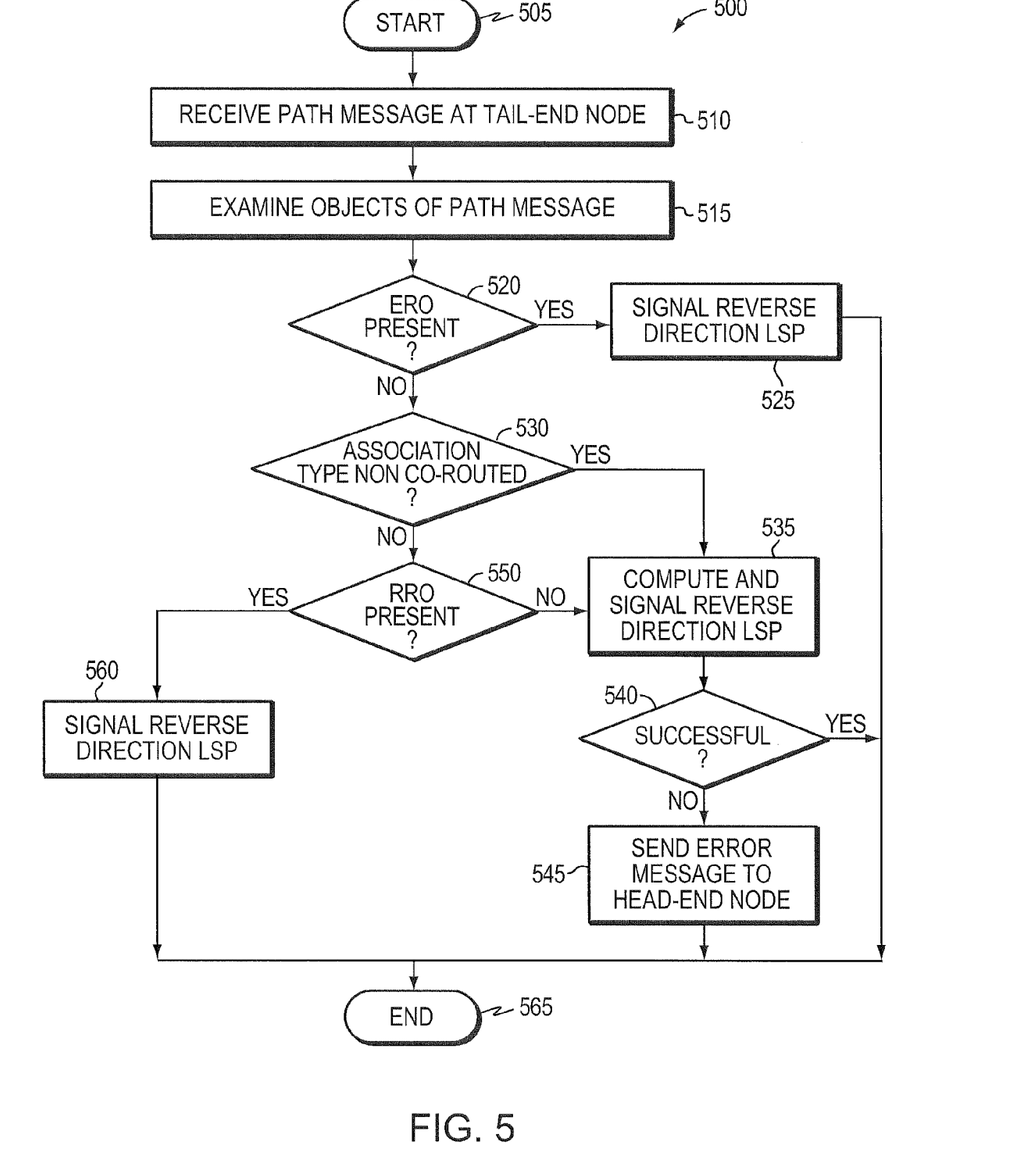
FIG. 5 illustrates an example simplified procedure for setting up and signaling co-routed and non co-routed LSPs of a bidirectional packet TE tunnel.

FIG. 5 illustrates an example simplified procedure for setting up and signaling co-routed and non co-routed LSPs of a bidirectional packet TE tunnel in accordance with one or more embodiments described herein. A head-end node may set up the bidirectional TE tunnel by computing a forward (and possibly a reverse) direction LSP. The head-end node may then signal the bidirectional TE tunnel by transmitting a RSVP Path message over the forward direction LSP to a tail-end node. The Path message may include objects, such as an Extended Association object specifying one of a plurality of additional Association Types that explicitly identifies the provisioning of the forward and reverse direction LSPs as co-routed or non co-routed.

The procedure 500 starts at block 505 and proceeds to block 510 where the tail-end node receives the RSVP Path message and, at block 515, examines the objects of the message, including the Extended Association object, used to set up and signal an appropriate reverse direction LSP, and bring up the bidirectional TE tunnel. At block 520, the tail-end node examines the objects to determine whether an ERO, e.g., a reverse direction ERO, is present in the RSVP Path message. In response to the ERO being present in the Path message, at block 525 the tail-end node signals the reverse direction LSP specified by the ERO and the procedure ends at block 565. However, in response to the ERO not being present in the RSVP Path message, at block 530 the tail-end node examines the Extended Association object of the message to determine whether the Association Type of the LSPs is non co-routed. In response to the Association type being non co-routed (i.e., yes), at block 535 the tail-end node attempts to compute and signal the reverse direction LSP. In response to the attempt being successful at block 540, the procedure ends at block 565. In response to the attempt being unsuccessful at block 540, i.e., the tail-end node is unable to compute or signal the reverse direction LSP, then at block 545 the tail-end node sends a RSVP signaling error message to the head-end node and the procedure ends at block 565. However, in response to the Association Type being co-routed (i.e., no) at block 530, the tail-end node examines the RSVP Path message to determine whether a RRO, e.g., a path RRO, is present in the Path message at block 550. In response to the path RRO being present, at block 560 the tail-end node uses the path RRO to signal the reverse direction LSP recorded in the RRO and the procedure ends at block 565. In response to the RRO not being present in the RSVP Path message at block 550, the tail-end node attempts to compute and signal the reverse direction LSP at block 535. In response to the attempt being successful at block 540, the procedure ends at block 565. In response to the attempt not being successful at block 540, the tail-end node sends a RSVP signaling error message to the head-end node at block 545 and the procedure ends at block 565.

Advantageously, the various embodiments described herein may be used to set up non co-routed bidirectional LSPs by, e.g., enabling a node to simply examine the Association Type 410 (e.g., Non Co-routed Double Sided Associated Bidirectional LSPs or Non Co-routed Single Sided Associated Bidirectional LSPs) of the Extended Association object 400 carried in a RSVP Path message 300, thereby obviating computation and signaling of the reverse direction LSP path ERO information or forward direction LSP path RRO information by the head-end node. The embodiments described herein may also be used to set up co-routed bidirectional LSPs by the tail-end node simply examining the Association Type 410 (e.g., Co-routed Double Sided Associated Bidirectional LSPs or Co-routed Single Sided Associated Bidirectional LSPs) of the Extended Association object 400 indicated by the head-end node. In response to determining the type of co-routed provisioning of the LSPs, the tail-end node may compute and signal the reverse direction LSP using, e.g., the forward direction path RRO information. It should be noted that examination of the contents of the RRO in the path message cannot, in itself, enable the tail-end node to infer the co-routed Association Type of the LSPs.

The various embodiments described herein are further useful for setting up inter-domain bidirectional TE tunnels having co-routed or non co-routed LSPs where the head-end node does not have a complete TE topology database (e.g., of the other domains) nor the ability to compute end-to-end paths in the reverse direction. For such inter-domain bidirection tunnel setup, a midpoint border node can use the additional Association Type 410 of the LSPs, in conjunction with an ERO, to perform loose hop ERO expansion in the reverse direction, accordingly. The tail-end node of the bidirectional tunnel may also provide appropriate local handling for the co-routed and non co-routed LSPs without having to relay relevant information to the head-end node to signal, re-signal and re-optimize the reverse direction LSP, thereby improving TE convergence and minimizing traffic loss. In addition, the embodiments described herein are inter-operable in a multiple vendor environment as it removes the ambiguity of the association type of co-routed or non co-routed LSPs.

While there has been shown and described example embodiments to enable setup and signaling of co-routed and non co-routed LSPs of a bidirectional TE tunnel in an unambiguous manner with respect to provisioning of the LSPs/tunnel, it should be understood that various other adaptations and modifications may be made within the spirit and scope of the embodiments herein. For example, although one or more of the embodiments described herein may be directed to single domain bidirectional LSPs/tunnels, the teachings herein are equally applicable to inter-domain bidirectional LSPs/tunnels. Here, the head-end node may create a TE LSP path that traverses multiple domains. However, the head-end node may not have knowledge of interior routing information of a particular domain; nevertheless, that routing information may be needed to specify the route within a path ERO. The head-end node may thus rely on loose abstract nodes within the ERO, and a midpoint border node may perform the CSPF calculation to compute the LSP for its particular domain. Accordingly, the head-end node may transmit a RSVP Path message over the forward direction LSP and the midpoint border router may perform the ERO expansion of the loose abstract nodes to compute the path for its domain. The border node may also examine the Association Type 410 of the Extended Association object 400 within the RSVP Path message 300 to determine whether the LSPs are co-routed or non co-routed. By checking the Association Type field 410, the border node may determine the co-routed or non co-routed provisioning of the LSPs in a simple, straightforward, and non-ambiguous manner, and thus may provision the bi-directional TE tunnel accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on one or more tangible (non-transitory) computer-readable storage media (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a tail-end node of a bidirectional tunnel, a first path message transmitted by a head-end node over a forward direction path of the bidirectional tunnel, the first path message including one or more objects used to set up and signal a reverse direction path of the bidirectional tunnel;
   signaling an explicit route object (ERO) specified in the first path message in the event the first path message specifies an ERO; and
   computing and signaling a reverse path message in the event the ERO is not present, an Association Type specified as non co-routed in an Extended Association object within the first path message and a record route object (RRO) is not present in the first path message.

2. The method as in claim 1, wherein the Association Type is Non Co-Routed Double Sided Associated Bidirectional LSPs.

3. The method as in claim 1, wherein the first path message is a first Resource Reservation Protocol (RSVP) path message and wherein the bidirectional tunnel is a bidirectional Traffic Engineering (TE) tunnel.

4. The method as in claim 1, wherein the forward direction path is a forward direction label switched path (LSP) and wherein the reverse direction path is a reverse direction LSP.

5. The method as in claim 1, wherein the ERO is a reverse direction ERO.

6. The method as in claim 1, wherein signaling the reverse direction path further comprises:
sending a second path message from the tail-end node to the head-end node over the reverse direction path; and
receiving a returned reservation message from the head-end node at the tail-end node.

7. The method as in claim 1, further comprising:
in the event the RRO is present in the first path message, signaling the reverse direction path recorded in the RRO.

8. The method as in claim 7, wherein the RRO is a path RRO.

9. The method as in claim 1, further comprising:
in response to unsuccessfully computing and signaling the reverse direction path,
sending an error message from the tail-end node to the head-end node.

10. The method as in claim 1, further comprising:
in response to the ERO being present in the first path message,
relaying error information to the head-end node in response to an occurrence of a failure.

11. A system comprising:
a network interface connected to a network, the network interface adapted to receive a first path message transmitted by a head-end node over a forward direction path of a bidirectional tunnel of the network, the first path message including one or more objects used to set up and signal a reverse direction path of the bidirectional tunnel;
a processor coupled to the network interface and adapted to execute one or more processes; and
a memory configured to store the one or more processes executable by the processor, the one or more processes when executed operable to:
signal an explicit route object (ERO) specified in the first path message in the event the first path message specifies an ERO; and
compute and signal a reverse path message in the event the ERO is not present, an Association Type is specified as non co-routed in an Extended Association object within the first path message and a record route object (RRO) is not present in the first path message.

12. The system as in claim 11, wherein the Association Type is Non Co-Routed Double Sided Associated Bidirectional LSPs.

13. The system as in claim 11, wherein the first path message is a first Resource Reservation Protocol (RSVP) path message and wherein the bidirectional tunnel is a bidirectional Traffic Engineering (TE) tunnel.

14. The system as in claim 11, wherein the forward direction path is a forward direction label switched path (LSP) and wherein the reverse direction path is a reverse direction LSP.

15. The system as in claim 11, wherein the one or more processes when executed to signal the reverse direction path is further operable to:
send a second path message from the tail-end node to the head-end node over the reverse direction path; and
receive a returned reservation message from the head-end node at the tail-end node.

16. The system as in claim 11, wherein the one or more processes when executed is further operable to:
in response to the RRO being present in the first path message, signal the reverse direction path recorded in the RRO.

17. The system as in claim 11, wherein the one or more processes when executed is further operable to:
in response to an unsuccessfully computing and signaling the reverse direction path, send an error message to the head-end node.

18. One or more computer readable storage media encoded with software comprising computer executable instructions and when the software is executed operable to:
receive, at a tail-end node of a bidirectional tunnel, a first path message transmitted by a head-end node over a forward direction path of the bidirectional tunnel, the first path message including one or more objects used to set up and signal a reverse direction path of the bidirectional tunnel;
signal an explicit route object (ERO) specified in the first path message in the event the first path message specifies an ERO; and
computing and signaling a reverse path message in the event the ERO is not present, an Association Type specified as non co-routed in an Extended Association object within the first path message and a record route object (RRO) is not present in the first path message.

19. The one or more computer readable storage media of claim 18, wherein signaling the reverse direction path further comprises:
sending a second path message from the tail-end node to the head-end node over the reverse direction path; and
receiving a returned reservation message from the head-end node at the tail-end node.

20. The one or more computer readable storage media of claim 18, further comprising:
in response to unsuccessfully computing and signaling the reverse direction path,
sending an error message from the tail-end node to the head-end node.

* * * * *